United States Patent [19]

Kohlmuller et al.

[11] 3,915,746

[45] Oct. 28, 1975

[54] FUEL CELL BATTERY HAVING AN IMPROVED DISTRIBUTOR ARRANGEMENT

[75] Inventors: Hans Kohlmuller; Karl Strasser, both of Erlangen, Germany

[73] Assignee: Siemens Aktiengesellschaft, Munich, Germany

[22] Filed: Nov. 16, 1973

[21] Appl. No.: 416,523

[30] Foreign Application Priority Data
Nov. 29, 1972 Germany............................ 2258482

[52] U.S. Cl. .............................................. 136/86 R
[51] Int. Cl. .......................................... H01m 27/00
[58] Field of Search............ 136/86 R; 204/255, 256, 204/257

[56] References Cited
UNITED STATES PATENTS

| | | | |
|---|---|---|---|
| 1,199,472 | 9/1916 | Levin | 204/256 |
| 3,666,561 | 5/1972 | Chiku | 136/86 R |
| 3,755,108 | 8/1973 | Raetzsch et al. | 204/255 |
| 3,806,370 | 4/1974 | Nischik | 136/86 R |

Primary Examiner—John H. Mack
Assistant Examiner—Feeley H. A.
Attorney, Agent, or Firm—Kenyon & Kenyon Reilly Carr & Chapin

[57] ABSTRACT

A fuel cell battery having an improved distributor arrangement, particularly useful with fuel cell batteries of the filter press type design and using a liquid electrolyte and at least one gaseous reactant in which the distributor is placed approximately in the center of the fuel cell battery thereby permitting use of the optimum material and resulting in a reduction in electrolyte leakage current.

5 Claims, 3 Drawing Figures

FUEL CELL BATTERY HAVING AN IMPROVED DISTRIBUTOR ARRANGEMENT

BACKGROUND OF THE INVENTION

This invention relates to fuel cell batteries in general and more particularly to an improved distributor arrangement for such fuel cell batteries.

Fuel cells and fuel cell batteries are normally operated using a liquid electrolyte. In some batteries, all the reactants are gaseous for example, hydrogen/oxygen cells. However, liquid reactants are also used, which reactants are preferably dissolved in the electrolyte. Examples of this type of cell are methanol or hydrazine cells. When assemblying fuel cells to form fuel cell batteries, one known method is that called the filter press technique. In this type of construction, a plurality of fuel cells are arranged in a stack and clamped together between end plates using threaded bolts. An arrangement such as this is shown in German Auslegeschrift 1,421,630. Typically in such batteries, the electrolyte and the reactants are fed into and discharged from the battery through the end plates in which holes for this purpose are formed. The end plates, which generally are made of plastic, must therefore meet a number of different requirements. First, they must exhibit high mechanical stability since they are stressed and particularly flexurally stressed by the clamping which is done in the outer portion of the end pieces. On the other hand, they must also be resistant to the reactants and particularly to the electrolytic liquid. These two requirements are only partially met by materials presently in use. For example fiber glass reinforced epoxy resin exhibits excellent mechanical stability but is only partially alkali-resistant. In particular, cut surfaces and feedthroughs are very susceptible to the electrolyte used in fuel cells. A material, which does exhibit good alkali-resistance in plexiglas. However, this material is not fully satisfactory in regard to mechanical stability.

Thus, it can be seen that there is a need for a fuel cell battery of the type that uses a liquid electrolyte and at least one gaseous reactant which avoids these problems. In particular, there is a need for such a design which permits an optimum choice of the material for the end plates and still permits proper distribution of the electrolyte and reactants.

SUMMARY OF THE INVENTION

The present invention achieves such a design primarily through the use of a distributor for the electrolyte and the reactants, respectively, which is approximately in the center of the battery. Through this arrangement, problems in the prior art devices wherein end plates must be capable of both withstanding mechanical stress and supplying reactants and electrolyte is eliminated. With this arrangement, the end plates may be selected strictly with regard to their mechanical strength without any consideration given to their resistance to the electrolyte and to the reactants. This is further enhanced by placing a contact sheet between the last fuel cell of the battery and the end plate, which contact plate is used for conducting current out of the battery. Thus, the fiberglass reinforced epoxy resin may be used as the end plate material. The material used for the distributor, which is now in the middle of the battery, no longer needs to meet high mechanical strength requirements since it is not flexurally stressed but is only subjected to the compression which occurs when the battery is clamped together. Thus, the material for the central distributor will preferably be a plastic, particularly a polymethacrylic acid ester. Polymethacrylates such as Plexiglas are very alkali-resistant and are therefore well suited for batteries such as $H_2/O_2$ batteries or hydrazine batteries with an alkaline electrolyte. The use of a material such as Plexiglas has additional advantages in that it can easily be worked. In addition to these above mentioned materials, other materials such as polystyrene may also be used for the distributor. The distributor should, of course, be constructed to match the type of construction used in the battery and thus, will normally be designed in a plate form. Through this type of construction, no additional difficulties are encountered in the assembly of the battery and its handling.

Preferably, the distributor will be made up of a plate having two major opposite surfaces with ducts running parallel to the major surfaces formed within the plate. The ducts which are used for supplying and removing electrolyte and reactants, will open into branch ducts which run between the two major surfaces and are coupled to corresponding ducts in the battery cells. Thus, the branch ducts in the distributor will be in communication with corresponding main ducts in the battery, which main ducts are then coupled through branch ducts to individual electrolyte and gas chambers in each of the cells. Thus, the distributor has a simple design and construction.

In addition, since materials can be selected according to their main purpose, the end plates and distributor can both be made having a structural volume which is reduced from that in prior art batteries. Thus, the overall battery will contain more cells for a given size and thus, a useful volume of the battery is increased. In addition, since the distributor acts to subdivide the battery into two portions, end plates as well as piping which is used in the case of separate batteries can be saved as compared to a set comprising two batteries of conventional design, each of the size of half the present battery. In the preferred embodiment, the distributor is thicker than a single fuel cell of the fuel battery. Because of this, the two sub-regions formed by the distributor are electrically decoupled resulting in reduced electrolyte leakage currents. This is particularly true since the electrolyte duct passing through the distributor in the longitudinal direction of the battery has a considerably higher ohmic resistance than the shorter main electrolyte duct of an individual fuel cell.

DETAILED DESCRIPTION OF THE PREFERRED EMBODIMENT

Figure 1:
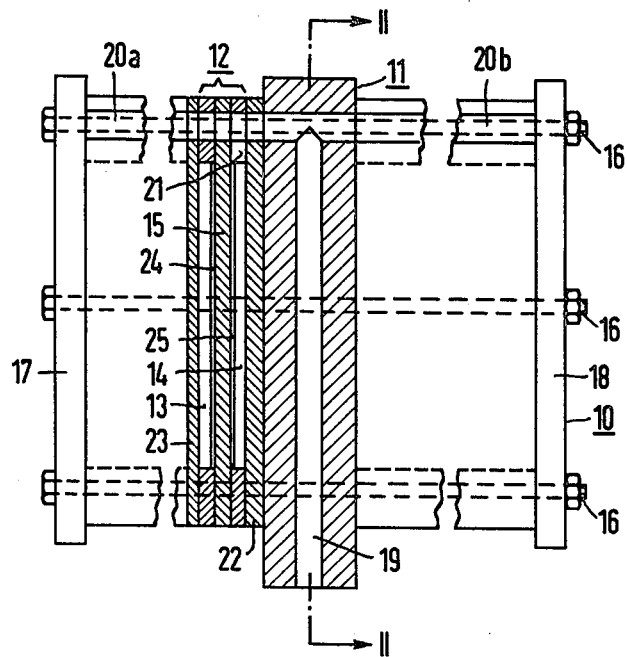
FIG. 1 is a cross-sectional elevation view of a battery having the distributor of the present invention.

The fuel cell illustrated by FIG. 1 is of the type in which a liquid fuel dissolved in an electrolyte reacts with a gaseous oxidant. The liquid fuel may for example be hydrazine which is dissolved in 6 m KOH, the latter being the electrolyte. The gaseous oxidant may for example be oxygen. Fuel cell batteries of this nature are well known in the prior art and are described in Swiss Pat. No. 526,206.

A typical fuel cell battery will have 60 fuel cells, with the battery of the present invention divided into two component batteries of 30 fuel cells each by the distributor 11. For sake of clarity, only one of the fuel cells has been illustrated on FIG. 1. It will be recognized that a plurality of fuel cells i.e. in a preferred embodiment 30, will be stacked on each side of the distributor 11. Each of the fuel cells 12 comprises a gas chamber 13 and an electrolyte chamber 14 separated from each other by an asbestos diaphragm 15. Individual fuel cells in the battery are separated from each other by respective separating sheets consisting of nickel or steel. The plurality of fuel cells along with the distributor 11 are clamped together between two end plates 17 and 18 which preferably will be made of fiberglass reinforced epoxy resin. Clamping is accomplished through a plurality of threaded bolts 16. The distributor 11 which will preferably consist of polymethacrylic acid ester (Plexiglas) contains a plurality of ducts. One duct each is provided for supplying and removing the electrolyte/hydrazine mixture referred to as the electrolyte ducts and one duct each for supplying and removing the oxidant, which as noted above will generally be oxygen, and referred to as gas ducts. In the view of FIG. 1, only one duct, the electrolyte discharge duct 19 is visible. As shown on the drawing, duct 19 has a T-shaped design at its upper end allowing it to be in communication with the ducts 20a and 20b of the two subregions of the battery. These ducts which will be referred to as the main ducts, more particularly the electrolyte discharge main ducts, are connected to branch ducts 21 in each of the fuel cells. Also, as shown on FIG. 1, a contact plate 22 is placed between the fuel cell 12 and the distributor 11. When assemblying the battery, a layer of asbestos paper, which provides a good seal when compressed, is inserted between the contact plate and the distributor only in the outer portion of the two members. A separator plate 23 is shown between the gas chamber 13 of fuel cell 12 and the next fuel cell which is not shown. Electrodes 24 and 25 are arranged on the two sides of the asbestos diaphragm 15 of the fuel cell 12. These are shown in more detail on FIG. 3 which will be described below.

Figure 2:
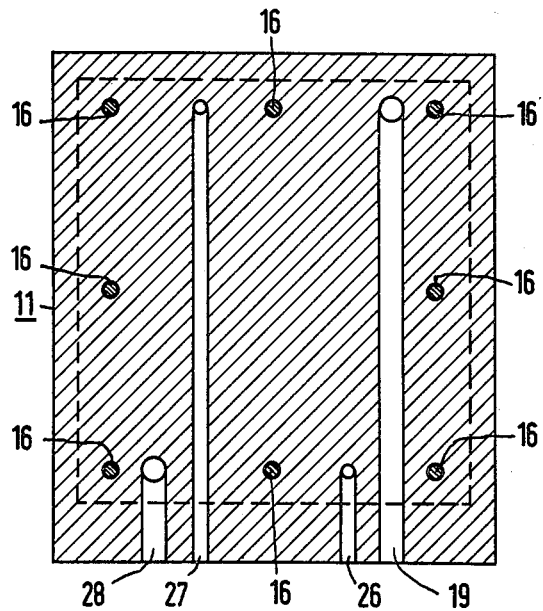
FIG. 2 is a cross-sectional view along the lines II—II of FIG. 1 showing the ducting within the distributor.

The cross-sectional view of FIG. 2 shows in more detail the various ducts. In addition to the duct 19 which is visible on FIG. 1, there is shown an oxidant discharge duct 27, an electrolyte supply duct 28 and an oxidant supply duct 26. Each of the ducts terminates in a T such as that shown with duct 19 of FIG. 1. Also, each will communicate with a corresponding main duct running through the plurality of fuel cells, which main duct is connected to appropriate branch ducts in each of the individual fuel cells. The two supply ducts 28 and 26 terminate in the bottom of the plate 11 with the discharge ducts 19 and 27 extending to near the top of the plate. Also shown on the cross-section of FIG. 2, is the arrangement of the bolts 16 for clamping together of the battery.

If the present invention is to be used in fuel cell batteries which are operated using two gaseous reactances, for example, hydrogen/oxygen batteries, the distributor will be provided with two additional ducts for the additional reactant. Thus, there will be provided input and discharge ducts for the electrolyte (aqueous potassium hydroxide or sulfuric acid), for the gaseous fuel (hydrogen) and for the gaseous oxidant (oxygen or air) resulting in a total of six ducts.

Figure 3:
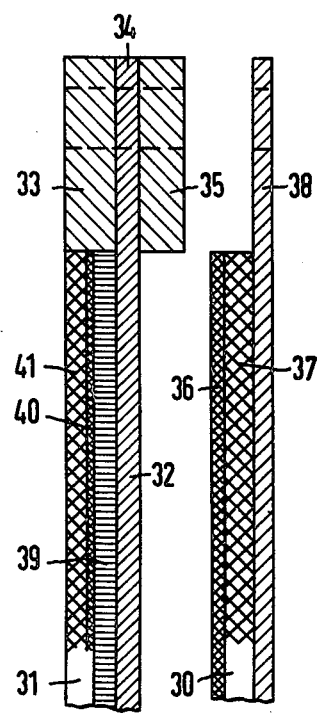
FIG. 3 is an enlarged cross-sectional view showing in more detail a single fuel cell of the battery of FIG. 1.

FIG. 3 illustrates a partial cross-section through a single fuel cell such as fuel cell 12 on FIG. 1. In the view of FIG. 3, the two electrodes have been separated for sake of clarity. Basically, the fuel cell comprises an electrolyte chamber 30 and a gas chamber 31 separated from each other by an asbestos diaphragm 32. As illustrated, the asbestos diaphragm has at its outer periphery an increased thickness being comprised of three layers indicated as 33, 34 and 35. The center layer of the reinforced outer zone is continued to the central part and forms the asbestos diaphragm 32. The zones of increased thickness of the diaphragms comprise electrolyte-impermeable and gastight material and have formed therein the main electrolyte and gas ducts along with appropriate ducts to conduct the electrolyte and oxidant to the respective electrolyte and gas chambers. Because of the pressure exerted when the bolts 16 are tightened down, the outer zones of the diaphragm which will be pressed against the separator plates (or the distributor or an end plate) provide an excellent seal for the electrolyte and gas chambers of the fuel cells, both between fuel cells and the outside of the battery so that additional sealing elements such as O-rings or flat rubber gaskets are not needed. In the electrolyte chamber 30 the anode 36 which serves as the hydrazine electrode is located adjacent to the asbestos diaphragm 32. The anode comprises a fine-mesh nickel screen which is coated, for instance, with Raney nickel having a coating density of about 40 mg/cm$^2$. Typically the active electrode surface is about 300 cm$^2$. Adjacent to the anode 36 is a coarse-mesh metal screen 37 which may be, for example, a nickel screen. Screen 37 acts as a spacer to form the electrolyte chamber 30 and at the same time may be used to conduct current from the anode 36. The metal screen is then in contact with a separator plate 38 for example, of steel, which abuts the next fuel cell in line (or the end plate for the last fuel cell.)

The cathode 39, which is the oxygen electrode, is also placed next to the asbestos diaphragm in the gas chamber 31 of the fuel cell. The cathode will be made, for example, of Raney silver in powder form with a thickness of about 130 mg/cm$^2$. The Raney-silver may advantageously be bonded with a hydrophilic binder. The catalytic material can also be mixed with asbestos fibers. The cathode 39 is pressed against the asbestos diaphragm 32 by a relatively fine-meshed nickel screen 40 and a coarse-mesh nickel screen 41 which serve the purpose of acting as spacers for the gas chamber and at the same time for current removal. When assembled, the cell would have a further separator plate next to the screen 41.

Typically, a fuel cell of this nature will have a thickness of about 3 mm. In accordance with the present invention the distributor can be made to be about 30 mm thick, although thinner distributors are also possible. With such a distributor, which will have a cross-sectional area of about 240 mm × 270 mm, the diameter of the electrolyte ducts is about 17 mm and the diameter of the gas ducts about 8 mm. A distributor of this nature can be constructed in a very simple manner. Only two drilling operations are required for each duct. A hole is made for each duct parallel to the major surfaces and another hole perpendicular to the major surfaces and intersecting the first hole.

If a 60 cell battery such as that described above, with the 60 cells separated into two component batteries of 30 fuel cells each is constructed, the elecetrolyte leakage loss is reduced from 35 W, typical in prior art batteries, to 25 W due to the electric decoupling effect of the distributor. Thus a reduction of leakage loss of approximately 30 percent is experienced for fuel cells connected in series. These figures are for a nominal load of 30 A.

The fuel cell battery described above can be modified in a number of ways from the example shown. Such modifications may be in the shape of a battery as well as in the types of electrodes and catalytic materials used. In addition to being used with different types of reactants, the battery disclosed herein is also suited for use with different types of electrolytes.

The distributor of the present invention may also be used in other types of battery construction, for example batteries constructed using a cementing technique. The advantages of simple design, particularly with regard to the end plates along with an increase in useful volume and reduction of piping costs can still be obtained. In addition, the beneficial effect of the reduction of electrolyte leakage current can also be fully obtained.

These and other modifications may be made without departing from the spirit of the invention which is intended to be limited solely by the appended claims.

What is claimed is:

1. In a fuel cell battery including a plurality of fuel cells stacked together between end plates and in which a liquid electrolyte and at least one gaseous reactant are supplied to each of said fuel cells through main ducts disposed therein from a distributor, the improvement comprising a distributor disposed approximately in the center of said fuel cell battery, said distributor comprising a plate having a pair of opposite major surfaces and a plurality of first ducts disposed parallel to said major surfaces, and a plurality of second ducts disposed perpendicular to said first ducts and extending through the plate, said first ducts opening into said second ducts and said second ducts being communicative and aligned with said main ducts of said fuel cells said first and second ducts forming the supply and discharge ducts for said fuel cells of said battery.

2. The fuel cell battery recited in claim 1, wherein said fuel cell battery comprises a filter press type battery.

3. The fuel cell battery recited in claim 1, wherein said distributor has a thickness which is greater than that of each of said fuel cells of said battery.

4. The fuel cell battery recited in claim 1 wherein said distributor is fabricated of plastic.

5. The fuel cell battery recited in claim 4 wherein said plastic comprises polymethacrylic acid ester.

* * * * *